*John G. Wetmore's Imp't in Car Truck.*

No. 120,013.

Patented Oct. 17, 1871.

Witnesses
John W. Shumway
A. J. Tibbets

John G. Wetmore
Inventor
By his Att'y
John E. Earle

UNITED STATES PATENT OFFICE.

JOHN G. WETMORE, OF WINSTED, CONNECTICUT.

IMPROVEMENT IN RAILWAY-CAR TRUCKS.

Specification forming part of Letters Patent No. 120,013, dated October 17, 1871.

*To all whom it may concern:*

Be it known that I, JOHN G. WETMORE, of Winsted, in the county of Litchfield and State of Connecticut, have invented a new Improvement in Car-Trucks; and I do hereby declare the following, when taken in connection with the accompanying drawing and the letters of reference marked thereon, to be a full, clear, and exact description of the same, and which said drawing constitutes part of this specification, and represents in—

Figure 1:
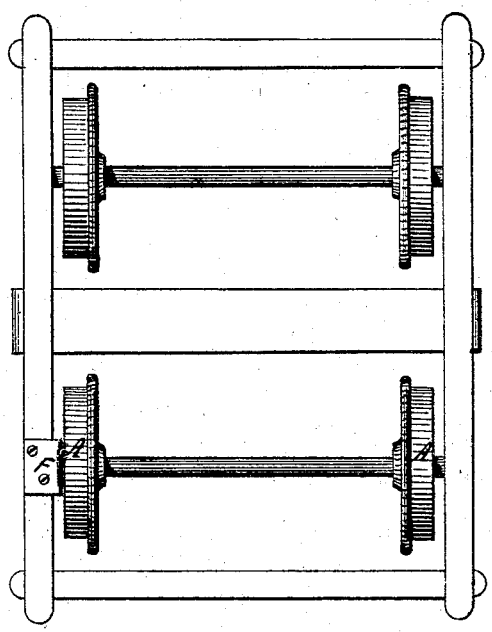
Figure 2:
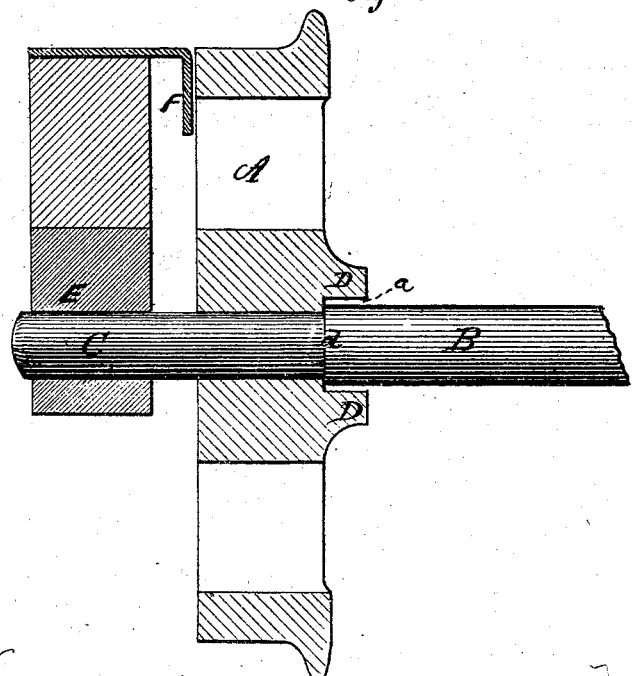

Figure 1 a top view of the truck; and in Fig. 2 a central section of the wheel illustrating my invention.

This invention relates to an improvement in car-trucks; the object of which is to prevent accidents in case of the breaking of the axle, applicable to all classes of railroad-wheels or wheels fixed to and revolving with axles. The invention consists in constructing the wheel with a chamber upon the inside around the axle and of larger diameter than the axle, extending from the shoulder over the axle a short distance, so that when the axle breaks at the shoulder it will be prevented from dropping by the said chamber, as axles seldom, if ever, break at any other point than the shoulder, against which the wheel is driven.

A is the wheel, of any desired construction. B, the axle, formed with a bearing, C, and shoulder D, against which the wheel is forced in the usual manner, and so firmly fixed with the axle as to revolve with it.

Heretofore this shoulder has been made upon the surface of the wheel; consequently, when the axle breaks there is nothing to support its end and it drops or allows the wheels to be thrown out of position, the result of which is a serious disaster.

Upon the inside of the wheel I form a chamber, *a*, around the axle by making a stout projecting flange, T, upon the inside of the wheel, so as to leave a slight space between the axle and the inner surface of the said flange—that is to say, so that the said flange shall not bear directly upon the axle—hence, when the wheel is driven onto the axle up to the shoulder, there will be a slight space left around the axle within the flange. The axle having the usual bearing E outside the wheel cannot be removed from that position so long as the axle is held up; therefore, when the axle breaks at the shoulder *d* the flange D will retain it in its position and prevent the wheel from tipping or the axle from dropping or being thrown out of position to any extent, the flange having no more effect upon the axle than if it were not present until the axle breaks.

As a further protection to prevent the wheel from tipping outward, as it would be naturally inclined to do, I arrange a guard, F, one or more, upon the truck, outside the wheel, in as close proximity to the wheel as may be without coming in contact with the wheel in its revolution; therefore, when the axle is broken, the surface of the wheel tipping outward will bear against the guard F and retain it nearly in its natural position.

In case of accident with this construction if not detected by the unavoidable rattling of the end of the axle within the chamber while in motion, it will be by the detector at the next station where the wheels are sounded.

I claim as my invention—

The bearing-plate F, constructed and arranged upon the truck-frame, as described, and adapted to act in combination with a recessed car-wheel, as set forth.

JOHN G. WETMORE.

Witnesses:
JOHN H. SHUMWAY,
A. J. TIBBITS.

(122)